United States Patent
Kramarz-Von Kohout

(10) Patent No.: US 8,599,722 B2
(45) Date of Patent: Dec. 3, 2013

(54) NET-BASED RECORDING OF TELEPHONE CONVERSATIONS

(75) Inventor: Gerhard Kramarz-Von Kohout, Bonn (DE)

(73) Assignee: Deutsche Telekom AG, Bonn (DE)

( * ) Notice: Subject to any disclaimer, the term of this patent is extended or adjusted under 35 U.S.C. 154(b) by 311 days.

(21) Appl. No.: 12/595,842

(22) PCT Filed: Apr. 14, 2008

(86) PCT No.: PCT/EP2008/002940
§ 371 (c)(1),
(2), (4) Date: Jan. 18, 2010

(87) PCT Pub. No.: WO2008/125321
PCT Pub. Date: Oct. 23, 2008

(65) Prior Publication Data
US 2010/0142387 A1    Jun. 10, 2010

(30) Foreign Application Priority Data

Apr. 17, 2007   (DE) .......................... 10 2007 017 951

(51) Int. Cl.
*H04L 12/16*   (2006.01)
*H04L 12/66*   (2006.01)

(52) U.S. Cl.
USPC .......................................... 370/259; 370/352

(58) Field of Classification Search
USPC ......... 370/251, 252, 259, 260, 351, 352, 261,
370/262; 379/67.1, 68, 69, 70, 85; 380/277,
380/278, 283
See application file for complete search history.

(56) References Cited

U.S. PATENT DOCUMENTS

| | | | |
|---|---|---|---|
| 6,529,602 B1 * | 3/2003 | Walker et al. | 380/283 |
| 7,227,930 B1 * | 6/2007 | Othmer et al. | 379/85 |
| 2002/0094065 A1 | 7/2002 | Squibbs et al. | |
| 2005/0226395 A1 * | 10/2005 | Benco et al. | 379/85 |
| 2007/0230446 A1 * | 10/2007 | Williams et al. | 370/352 |

FOREIGN PATENT DOCUMENTS

| | | |
|---|---|---|
| DE | 101 61 660 | 7/2003 |
| DE | 102 61 478 | 7/2004 |
| DE | 10 2004 026 021 | 12/2005 |
| EP | 1 286 524 | 2/2003 |
| WO | 98/39901 | 9/1998 |
| WO | 02/07420 | 1/2002 |

OTHER PUBLICATIONS

German Search Report dated Jan. 15, 2008 in corresponding German Application No. 10 2007 017 951.2.
Foreign patent document with English language abstract.

* cited by examiner

*Primary Examiner* — Michael Thier
*Assistant Examiner* — Feben M Haile
(74) *Attorney, Agent, or Firm* — Faegre Baker Daniels LLP

(57) ABSTRACT

A method for the ability to regulate and control a recording of a telecommunications connection, wherein the signals generated in the telecommunications connection are tapped and stored in a system. A storage occurs according to the specifications of the respective telecommunications subscriber and/or the respective network operators involved, and the signals of the telecommunications connection to be recorded can be stored as encrypted data files directly in the network of the telecommunications network used, where the data files can be decrypted, and the contents reproduced, by means of appropriate release by the subscribers of the telecommunications connection and/or by means of appropriate authorization of third parties.

18 Claims, No Drawings

NET-BASED RECORDING OF TELEPHONE CONVERSATIONS

CROSS-REFERENCE TO RELATED APPLICATION

This application is related to and claims the benefit under 35 U.S.C. §119 and 35 U.S.C. §365 of International Application No. PCT/EP2008/002940, filed Apr. 14, 2008, the reference of which is expressly incorporated herein by reference.

The invention relates to a method for the ability to regulate and control a net-based recording of telephone conversations and other forms of telecommunication such as for example circuit switched or packet switched data connections with one or more subscribers, here conceptually summarized as "net-based recording of a random telecommunications connection."

A method for the reproducibility (recording) of a telephone conversation generally known from the state of the art is disclosed in Publication DE 10 2004 026 021 A1, wherein for the reproducibility of a telephone conversation the voice signals produced in the telephone conversation are tapped near the end-device and stored in a receiving unit, which for example is connected by means of Bluetooth to the end-device and the recorded telephone conversation can be tapped by means of the input of a release code, such as for example a PIN code (Personal Identity Number).

The essential disadvantage in this connection is that the voice signals can basically only be reproduced and retrieved by one of the two subscribers, whereas the other subscriber in general has no control over the recording and no direct access to the storage medium or system of his conversation partner.

In addition the recorded voice signals are likewise not directly accessible to a third person.

Conversations in a German telecommunications network between at least two telephone subscribers are subject to German telecommunications secrecy, which currently does not allow a recording of telephone conversations unless all persons participating in the conversation consent to this recording prior to the conversation.

It is known that conversations even on the telephone are basically "transient". This means that after the completion of a conversation the spoken words of the subscribers are lost or are not reproducible and in the best case are only present in the memory of the participants.

However, there are a plethora of reasons for the participating subscribers of a telephone conversation to prepare the spoken words in reproducible manner, because it seems interesting and important to them to be able to listen to a conversation at a later time once again verbatim. This is the case for example when important circumstances of an upcoming conclusion of a contract are discussed between two subscribers, which should be reproducible for written implementation of the contract.

Under certain requirements it can likewise also be important or necessary for third parties to have access to the contents of a telephone conversation that has already been conducted, in which they themselves did not participate.

This applies not only for telephone conversations but rather also accordingly for other kinds of electronic communication, such as for example circuit switched or packet switched data traffic between two subscribers as well as also "IP sessions" of a subscriber.

End-device-based solutions currently exhibit the previously described limitations.

From the current perspective up to now no adequate or net-based solution belonging to the state of the art has been disclosed.

Similar to the mentioned publication DE 10 2004 026 021 A1, end-devices or add-on devices for end-devices are available on the market which make possible the recording of a conversation conducted via said end-device.

The use of such end devices or add-on devices is, however at least from a legal point of view problematic, since the conversation partner as a rule does not have knowledge of the technical possibilities of the opposite side or the conversation is sometimes being recorded by the opposite side without his prior consent.

Hence the conversation partner of persons having such an end device or add-on device at their disposal does not have any control options as to whether the conducted conversation is recorded or not.

In addition it is not technically possible for Third Parties in this way purposefully to realize recordings without the knowledge or consent of the participants, even if said Third Parties were authorized to do so.

In addition it is known that the monitoring of telephone conversations, in which the telecommunication of a single subscriber—as a rule by court order—is to be monitored ("Legal interception"), is not technically realized via a net-based recording.

Instead of this in switching technology conference bridges are used, with which telecommunications connections are so to speak "doubled" and the copy is diverted to the connection of a Third Party, as a rule an agency authorized for this purpose.

Only at the connection of this Third Party is the telecommunications connection recorded and evaluated.

The monitored subscribers themselves however have no access to the recorded telecommunication.

Hence a private usage of such monitoring technology is currently generally out of the question.

Hence currently there are no net-based solutions for the recording of a telephone conversation known, which under controlled conditions facilitate a later usage of the recordings in particular by subscribers of the conversation and/or by Third Parties authorized to do so.

SUMMARY

For this reason the present invention sets itself the task of making available a method and a device for the carrying out the method for the ability to regulate and control a recording of a telecommunications connection, wherein the recorded telecommunications connection is stored network internally and the contents can be reproduced in the simplest manner.

For the solution of the set task the invention is characterized by the features of the patent claims.

One significant advantage of the invention is the fact that the conversation or telecommunications connection signals to be recorded can be stored directly as encrypted files on the network of the telecommunications network used, wherein said data files can be decrypted, and their contents reproduced, by means of appropriate release by the subscribers of the telecommunications connection.

Another significant advantage is the fact that in dependency on the embodiment the data files of the recorded telecommunications connections can be reproduced by Third Parties if they have an appropriate authorization for decryption of the data files.

Hence the objective lies in solving the previously described problem comprehensively by means of the subject matter of the invention described here.

DETAILED DESCRIPTION

Customers of a telecommunications provider—regardless of whether it is a matter of communications via mobile telephony, fixed network or IP (Internet Protocol)—have in the realization of the inventive concept the advantage of having access in the simplest manner to a technically high quality copy and hence to the contents of the telecommunications connection already conducted if this is desired or required.

As a result of this for example a user knows already prior to the beginning of a telephone conversation that important information from the following telephone conversation cannot be lost and can be listened to later once more.

Depending on the embodiment of the invention the solution disclosed here also offers authorized Third Parties access to copies of the contents of the telephone conversation.

In addition, depending on the embodiment, the inventive concept realizes the ability to regulate and control a recording of a telecommunications connection, which takes place in particular subject to the relevant legal provisions of data protection and telecommunications secrecy.

In the case of a telecommunications connection between the two subscribers A and B in one of the participating switching systems the signals associated with the telecommunications connection are duplicated for example via a conference bridge.

This can be implemented both in the switching system of the connecting network as well as also that of the network providing the connection.

The duplicate, that is the copy for example of a conversation, is preferably forwarded to a system suitable for this purpose.

The contents of the duplicate are recorded there and after digitizing, if required, and recoding to a suitable format, such as for example for a telephone conversation to "mp3 format", are stored as a "recording" of the connection.

Depending on the embodiment of the invention the storage of the duplicate digitized or recoded as needed takes place in a cryptographically secured manner.

In the case of data connections between two subscribers or in the case of accesses of individual subscribers to computer-supported systems, such as for example by "surfing on the Internet", the same applies. Here too in one of the participating switching systems or servers a copy can be created, which in the original format or after recoding to a suitable format preferably can be backed up cryptographically and be stored as a "recording" of the telecommunications connection.

The central aspect of the present invention is making available on the one hand the configurability of the control of which telecommunications connections are to be included in the recording and on the other hand the development of a freely selectable determination of who has access in which way to the recorded telecommunications connections.

Thus for one thing different embodiments for control of which telecommunications connections are to be included in the recording are possible:

Subscribers A and B must both have signed on for this service beforehand with reference to the call numbers or other identifications used by them.

This means that all telecommunications connections between the two subscribers who have consented to such a service will be recorded.

As an alternative the information for the consent of clients is centrally stored in a database for example by a national regulatory body. During the establishment of a connection this databank can be queried.

Both subscribers A and B consent to the recording before the beginning of their conversation.

This is for example possible by means of a generated network announcement of the type:

» This conversation will, if you wish, be recorded. Please consent to the recording by pressing the "*" button now. «

Only if both subscribers consent, to remain in the example, by pressing the "*" key, does a recording of the conversation take place.

The recording of the conversation takes place then depending on the embodiment immediately or not until further information of the subscribers, for example by the announcement of the recorded message:

» This conversation, as you wished, will be recorded from this point on. «

This form of consent relates only to the one following conversation and hence has no effects on subsequent conversations.

In principle all telecommunications connections will be recorded by the network operator.

Conversations will be recorded by the network operator in accordance with the guidelines of Third Parties, for example government agencies, who arrange the recording of all telecommunications connections by subscribers to be determined for a specific period of time.

Which approach may be practiced by network operators or appropriate service providers is in particular dependent on the respective legal situation with regard to data protection and telecommunications secrecy which apply for the providers of the aforementioned services or for the network operators.

The current requirements of the European guideline on "Data Retention" relate to a long-term storage of so-called speech accompanying data such as time, duration, participating call numbers or identifications.

If an expanded guideline should also apply to the contents of stored telecommunications connections, the present subject matter of the invention in the embodiment described here covers these expanded requirements.

This also applies for the application that in principle all telecommunications connections must be recorded by the network operators, if this should become a legal guideline someday.

For another thing, the telecommunications subscribers can access the "recording" in different ways after completion of the telecommunications connection.

For this purpose diverse possibilities are available depending on the embodiment and type of telecommunications connection:

Access via Web Interface.

This means that the recording of the telecommunications connection can be stored by download to one's own computer.

As an alternative the recording especially of a telephone conversation can be intercepted on one's own computer by means of audio streaming without a direct download option existing in this connection. Audio streaming can also be used for text-based telecommunication such as SMS or e-mail if said text-based telecommunication is automatically converted to audio signals.

Access by means of electronic communication, for example by e-mail.

This means that a data file of the recorded conversation is sent in a suitable format by attachment of an e-mail to an e-mail address of the subscriber to be saved in advance in the system. Other forms of an electronic communication, such as for example by MMS (Multimedia Messaging Service), are also possible.

Access by audio message to one's own end device, if for example via a call to subscriber A or B the recorded conversation is played back, so that the conversation can be listened to once again by subscriber A or B.

For this purpose the switching system, depending on the embodiment for example by SMS makes an, if necessary, cost-free call number and information on the referencibility of the respective conversation available to the subscribers. If the subscriber selects this call number, he receives the opportunity to listen to the recording.

This aforesaid access type has already been disclosed with the invention DE 101 61 660 A1 harking back to the same applicant, wherein said invention discloses a method for synchronous distribution of random audio information, such as language, sounds and/or noises preferably time-shifted to several recipients in a message network, wherein the information as digital/analog signals to predetermined recipients directly, or after notification about the presence of information for the appropriate recipient is sent or can be called by said recipient.

To avoid misuse appropriate security mechanisms are to be implemented in order to safeguard access to the contents of the recorded telecommunications connections by unauthorized persons pursuant to the applicable guidelines.

Thus the access to the corresponding data file can preferably take place only by a joint and equal access by the caller and the person being called.

For this purpose the files are encrypted on the system side, wherein a decryption of the files is possible exclusively by a joint encryption of both subscribers.

This means that both parties have only a part of the necessary cryptographic key necessary for decryption.

As an alternative the data file is double encrypted, wherein the caller has the first necessary key for encryption and the person being called has the other one, as a result of which here to the decryption can only take place jointly.

In principle in this connection the application of asymmetrical crypto methods, such as for example the "PGP" method (Pretty Good Privacy Method) is to be recommended.

A secure embodiment of an access via a Web interface will be briefly described in the following.

Two subscribers A and B each have access to the system upon which the encrypted telecommunications connection files are stored, each said file being protected via a password or other protection methods known from the state of the art.

A correct input of the password permits access to the conversation data files which however are still encrypted with the cryptographic keys of both subscribers participating in the conversation.

Subscriber A can release the conversation data files for decryption with his decryption key by performing a selection of said conversation data files.

However, access to the corresponding data files of the recorded conversations for conversation partner A is only possible when conversation partner B has also released said data files and vice versa. This means that only through a joint release of both participating conversation partner A and B are the released files available for downloading or audio streaming to the participating conversation partner A and B.

So that also Third Parties who are authorized for this purpose, achieve access to a stored file of a telephone conversation or of a telecommunications connection e.g. between subscribers A and B, further copies of the original or digitized and recoded data files can be created on the system side, which are encrypted with a cryptographic key assigned to the respective Third Party.

The invention claimed is:

1. A method for regulating and controlling a recording of a telecommunications connection in telecommunications networks, comprising the steps of:
    tapping and storing signals produced in the telecommunications connection between two subscribers in a system, wherein storing and accessing the signals take place according to freely selectable specifications of a respective telecommunications subscriber and of a respective network operator involved in the telecommunications connection,
    duplicating via a conference bridge the signals produced in the connection between the two subscribers,
    storing the signals to be recorded as encrypted data files directly on the telecommunications networks used,
    decrypting these data files and reproducing the contents by means of appropriate release by the subscribers of the telecommunications connection and/or by means of appropriate authorization of third parties,
    carrying out the storage of the data files of the telecommunications connection only after a logon and consent of the subscribers of the telecommunications connection, wherein the logon information of the subscribers of the telecommunications connection is exchanged between network operators of different telecommunications networks prior to the storage,
    centrally storing in a database the information about the consent of the subscribers of the telecommunications network connection, and
    querying and evaluating said consent information during the establishment of the setup of the respective telecommunications connection.

2. The method according to claim 1, wherein the recording or storing of data files of a telecommunications connection is carried out on a mobile telephony network fixed network or on an Internet Protocol network by at least one of the network operators involved.

3. The method according to claim 1, wherein the network operator records and stores all telecommunications connections as a basic principle.

4. The method according to claim 1, wherein the stored data files of the telecommunications connection are protected from an unauthorized access.

5. The method according to claim 1, wherein prior to the storage of the telecommunications data files a digitization and/or recoding of the data in the data files takes place.

6. The method according to claim 1, wherein the storage of the data files of the telecommunications connections takes place in a cryptographically secured manner.

7. The method according to claim 1, wherein prior to the storage of the telecommunications data files a digitization and/or recoding of the data in the data files takes place.

8. The method according to claim 1, wherein the consent of both subscribers is carried out at the beginning of the respective telecommunications connection by means of generated questions and explicit consent of the subscribers of the telecommunications connection.

9. The method according to claim 1, wherein conversations are recorded by the network operator according to the specifications of third parties which arrange recording of all telecommunications connections of subscribers to be determined for a specific time period.

10. The method according to claim 1, wherein an access of authorized persons to the stored data files of the telecommunications connections can be carried out by means of Web interface for downloading or as audio streaming, by means of electronic communication and/or by audio message.

11. The method according to claim 1, wherein an access to a decrypted recording of the telecommunications connection requires the release and decryption of the encrypted stored data files by all subscribers of the telecommunications connection.

12. The method according to claim 1, wherein an access to a decrypted recording of a telecommunications connection by third parties does not require the release and decryption of the encrypted stored data files by all subscribers of the telecommunications connection.

13. The method according to claim 2, wherein the network operator records and stores all telecommunications connections as a basic principle.

14. The method according to claim 2, wherein the stored data files of the telecommunications connection are protected from an unauthorized access.

15. The method according to claim 2, wherein the prior to the storage of the telecommunications data files a digitization and/or recoding of the data in the data files takes place.

16. The method according to claim 3, wherein the stored data files of a telecommunications connection are protected from an unauthorized access.

17. The method according to claim 3, wherein prior to the storage of the telecommunications data files a digitization and/or recoding of the data in the data files takes place.

18. A method for regulating and controlling a recording of a telecommunications connection in telecommunications networks, comprising the steps of:

tapping and storing signals produced in the telecommunications connection in a system, wherein storing and accessing the signals take place according to freely selectable specifications of a respective telecommunications subscriber and of a respective network operator involved in the telecommunications connection, storing the signals to be recorded as encrypted data files directly on the telecommunications networks used, decrypting these data files and reproducing the contents by means of appropriate release by the subscribers of the telecommunications connection and/or by means of appropriate authorization of third parties, carrying out the storage of the data files of the telecommunications connection only after a logon and consent of the subscribers of the telecommunications connection, wherein the logon information of the subscribers of the telecommunications connection is exchanged between network operators of different telecommunications networks prior to the storage, centrally storing in a database the information about the consent of the subscribers of the telecommunications network connection, and querying and evaluating said consent information during the establishment of the setup of the respective telecommunications connection, wherein the logon information of the subscribers of the telecommunications connection is exchanged between a fixed network and mobile telephony network of different network providers prior to the storage.

* * * * *